Nov. 10, 1964    C. E. WELLER ETAL    3,156,837
ELECTROMAGNETIC RECIPROCATIVE SAW
Filed April 3, 1963    3 Sheets-Sheet 1
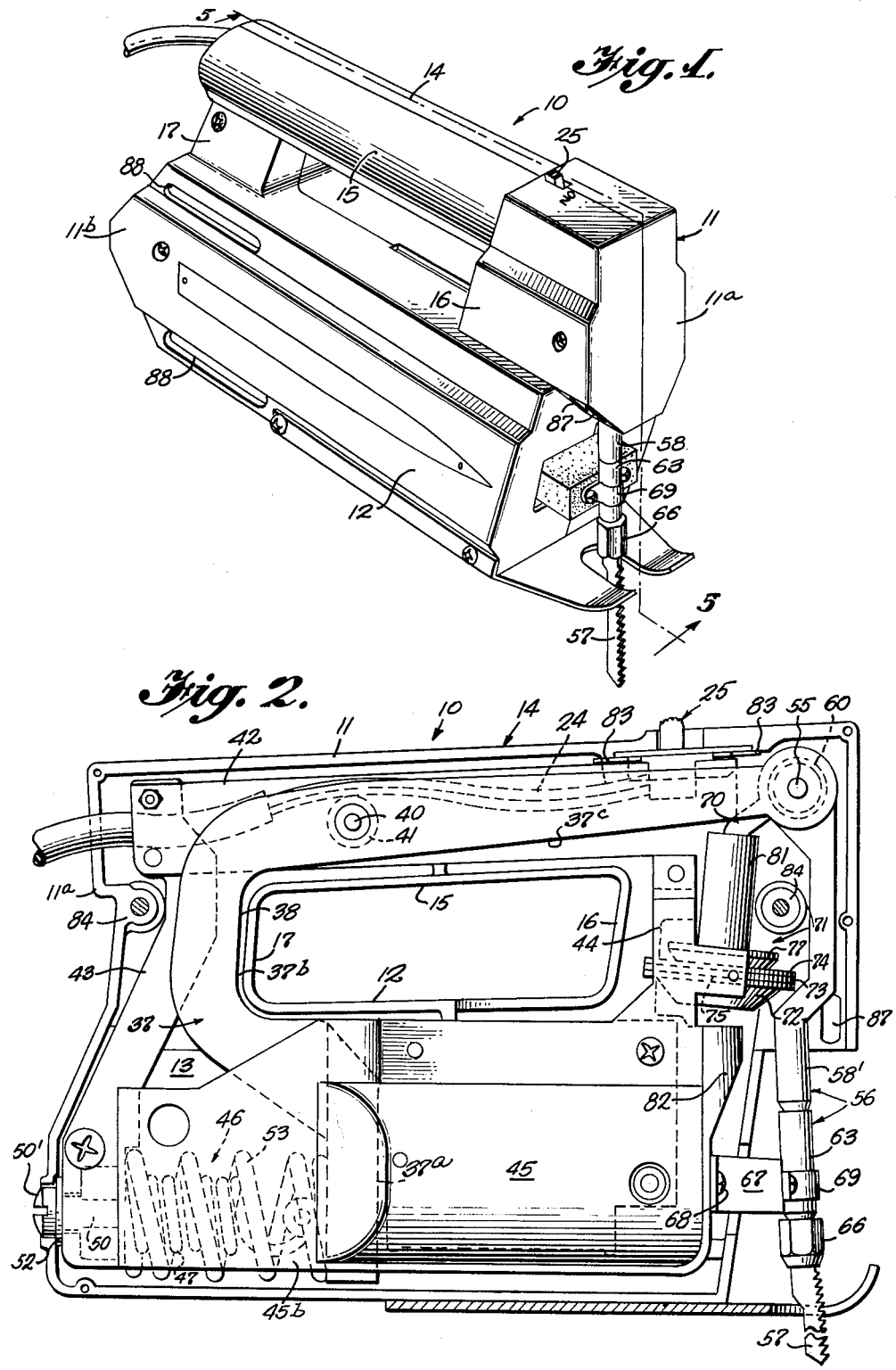

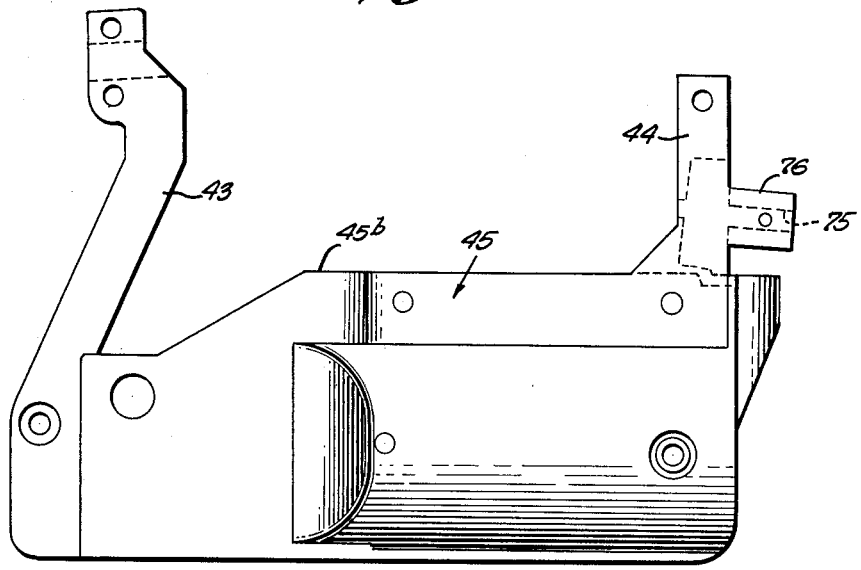
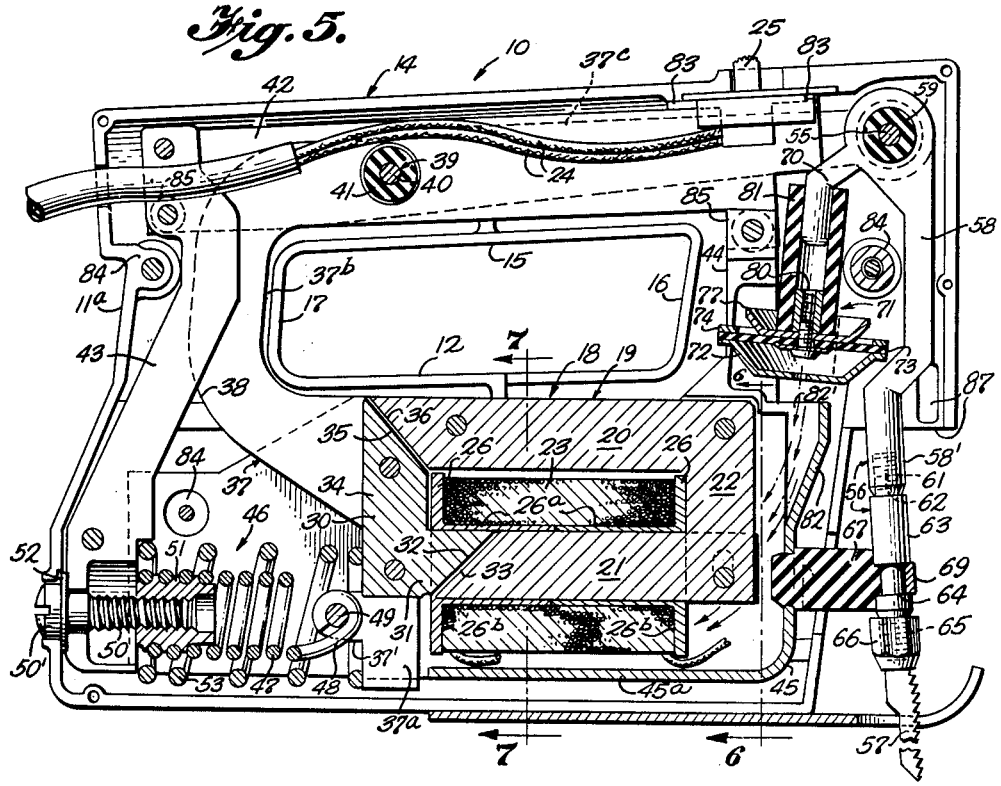

Nov. 10, 1964  C. E. WELLER ETAL  3,156,837
ELECTROMAGNETIC RECIPROCATIVE SAW
Filed April 3, 1963  3 Sheets-Sheet 3
Fig. 6.
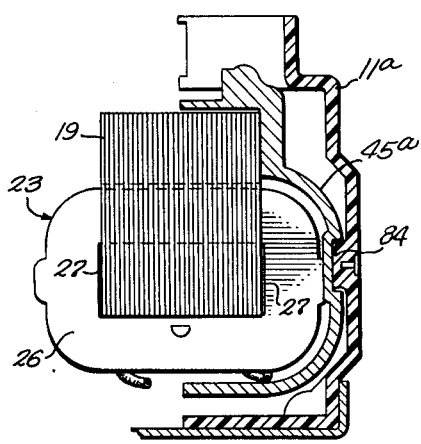
Fig. 7.
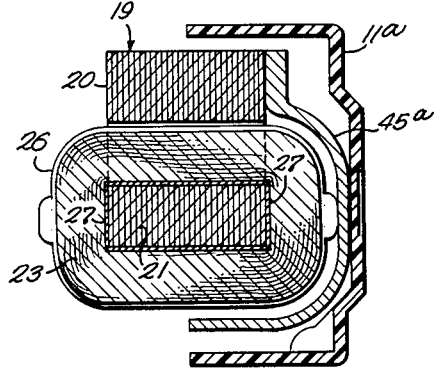
Fig. 4.
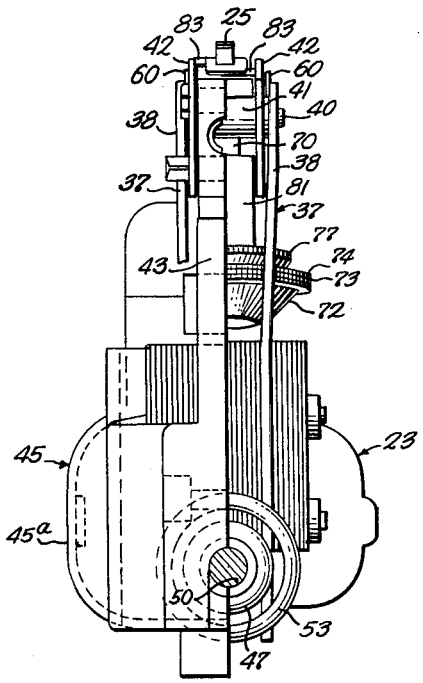
Fig. 8.
INVENTORS
CARL E. WELLER,
DONALD R. FEGLEY &
ALDEN J. BRASSAW
BY Mason, Fenwick & Lawrence
ATTORNEYS United States Patent Office 3,156,837
Patented Nov. 10, 1964

3,156,837
ELECTROMAGNETIC RECIPROCATIVE SAW
Carl E. Weller and Donald R. Fegley, Easton, Pa., and Alden J. Brassaw, Phillipsburg, N.J., assignors to Weller Tool Corporation, Luquillo, Puerto Rico, a corporation of Puerto Rico
Filed Apr. 3, 1963, Ser. No. 270,274
9 Claims. (Cl. 310—29)

The present invention relates in general to vibratory electric tools, and more particularly to portable vibratory electromagnetic devices of the type commonly known in the art as saber saws.

The more common expedient normally employed in commercial tools of the saber saw type for driving the saw blade in its reciprocative path is to couple the blade chuck to a rotary electric motor, as by an eccentric drive from the motor shaft to the blade chuck. Such devices involve a relatively complex construction and accordingly high production costs.

Vibratory electromagnetic motors, comprising generally an alternating current electromagnet having a stator core fixed to the tool casing and a pivoted armature connected to the blade chuck, provide sufficient power to effectively drive a saber saw blade through its reciprocative stroke for most work applications and represent a less expensive construction. However, considerable difficulty is encountered in achieving an optimum arrangement and relationship of components for transferring driving movement from the armature to the blade with such an electromagnetic motor and in regulating movement of the blade chuck while achieving minimum practical size, weight and power requirements of the tool. Problems are presented also in maintaining effective support of the moveable components of the saber saw, particularly of the blade and chuck, over a tool life span of long duration, in view of the high force moments arising when cutting through more resistant materials or materials of substantial thickness.

Further, considerable heat is evolved by such electromagnetic motors which may be a source of discomfort to the user and accelerated deterioration of the tool. As the power requirements are increased by pivoted armature designs of short radius, the heat evolved is accordingly increased. Size restrictions on tools of this type have made it difficult to provide adequate heat dissipation by natural circulation or ventilation to insure comfort to the user and maximum life for the tool.

An object of the present invention is the provision of a novel saber saw construction which provides a portable tool of practical size, weight and power requirements while effecting reciprocation of the saw blade by an electromagnetic motor.

Another object of the present invention is the provision of an electromagnetic saber saw having a novel arrangement of components to provide a long radius arm connection from the armature to the saw blade in a tool of practical size.

Another object of the present invention is the provision of a novel electromagnetic saber saw having means for inducing forced air circulation within the interior of the casing to reduce heat accumulation within the casing during operation.

Another object of the present invention is the provision of a novel electromagnetic tool having an air pump driven by an extension of the armature to propel cooling air in selected paths about the operating components and especially about the static windings and render the tool cool in operation.

Other objects, advantages, and capabilities of the present invention will become apparent from the following detail description, taken in conjunction with the accompanying drawings illustrating a preferred embodiment of the invention.

In the drawings:

FIGURE 1 is a perspective view of an electromagnetic saber saw constructed in accordance with the present invention;

FIGURE 2 is a side elevation of the saber saw with the proximal casing half removed;

FIGURE 3 is an elevation view of one of the frame halves;

FIGURE 4 is an end view of the saber saw with the casing and half of the frame removed;

FIGURE 5 is a longitudinal vertical section view of the saber saw, taken along the line 5—5 of FIGURE 1;

FIGURE 6 is a fragmentary section view taken along the line 6—6 of FIGURE 5;

FIGURE 7 is a fragmentary section view taken along the line 7—7 of FIGURE 5; and FIGURE 8 is an exploded section view of the air pump assembly.

Referring to the drawings, wherein like reference characters designate corresponding parts throughout the several figures, there is illustrated a preferred embodiment of the vibratory electromagnetic saber saw embodying the present invention which is indicated generally by the reference character 10. The saber saw 10 comprises a casing 11 formed of complementary molded halves 11a, 11b including a lower housing portion 12 defining a chamber 13 for enclosing the principal working components of the saber saw and a handle portion 14 having a generally inverted U-shaped configuration projecting upwardly from the lower housing portion 12. The handle portion 14 includes an elongated hollow grip member 15 and handle post members 16, 17, at least the forwardmost of which is hollow, extending upwardly from the lower housing portion 12 to the front and rear end portions of the grip member 15.

The saber saw 10 is powered by an electromagnet 18 having a C-shaped core 19 of iron core laminations formed with parallel, vertically spaced, horizontally disposed legs 20 and 21 and a vertically extending bridge portion 22 interconnecting the right-hand ends of the two legs 20, 21 as viewed in FIGURES 2 and 5. Wound upon the lowermost core leg 21 is an electromagnet coil 23 which is supplied with 60-cycle alternating current voltage at 110 volts through leads 24 controlled by a manual switch 25. The coil 23 is preferably formed by winding the wire turns on a pair of coil bobbing members 26 having annular sleeve portions 26a surrounding the lower horizontal core leg 21 and a pair of coil strap members 27 laterally flanking the leg 21 and having radially projecting flange 26b at the relatively remote end of each bobbin member 26.

An armature 30 formed of iron core laminations and having a substantially L-shaped configuration is disposed closely adjacent to the free ends of the stator core legs 20 and 21.

The generally L-shaped armature 30 includes a horizontal leg portion 31 shown in the accompanying drawings as having a substantially right-triangular profile providing a downwardly and forwardly inclined planar face 32 which in the proximal limit position of the armature 30 relative to the core 19 closely approaches and lies substantially parallel to the inclined face 33 of the lower stator core leg 21. Similarly the upper end of the vertical leg 34 of the armature is shaped to provide an upwardly and forwardly inclined face 35 substantially paralleling the inclined face 36 of the upper stator core leg 20 when the armature occupies its proximal limit position relative to the core.

The armature 30 is carried by an elongated lever or armature arm 37 which in the preferred embodiment herein described is formed of two elongated metallic strap members 38 which flank the armature 30. The arm 37 has a lower foot portion 37a, which in the upper region thereof has a profile corresponding to that of the armature 30, an intermediate U-shaped portion 37b progressing away from the core 19, and a top portion 37c forming an elongated extension of the upper leg of the U-shaped portion of sufficient length to project fully through the length of the handle grip member 15. The armature 30 is rigidly connected to the strap members 38 of the armature arm 37 by a plurality of through bolts and the lower end of the arm 37 is free to move axially of the core leg 21. The armature arm 37 is mounted for pivotal movement about a pivot axis 39 formed by a pivot bolt 40, which extends through a fixed pivot bearing 41, formed for example by an inner neoprene bearing sleeve housed in the bore of a metallic outer bearing tube whose ends are fixed in openings in a pair of laterally spaced and aligned rigid pivot straps 42. The opposite end portions of the pivot straps 42 are secured by bolts or other rigid fasteners to longitudinally spaced, upwardly projecting arms 43, 44 of a supporting frame 45 fixed within the casing. The supporting frame 45 is formed of two complementary halves 45a, 45b molded from aluminum alloy each having a lower portion shaped to define with the mating half an enclosure for the electromagnet 18 and the pair of rising arms 43, 44. One of the frame halves is shown in FIGURE 3. These frame halves 45a, 45b are secured together and to the core 19 at a plurality of points by suitable screws or bolts and form a rigid supporting frame for many of the components of the saber saw as will more clearly appear from the ensuing description.

The armature 30 is normally held in a floating condition spaced from the pole faces 33 and 36 of the stator core 19 at the medial position in its vibratory stroke by means of a spring assembly 46 similar to the spring assembly shown in earlier U.S. Patent No. 2,790,276 granted April 30, 1957, to Sarkis Doctor Acopian, which includes a tension coil spring 47 having a hook-shape formation 48 on the end thereof adjacent the armature 30 which is looped about a securing pin 49 on an extension 37' of the armature arm 37 and centered thereon, as for example by flanking tubular spacers. The opposite end of the tension coil spring 47 is coupled to an adjusting screw 50 by means of a spring anchor 51 in the form of an internally and externally threaded washer coupled by its external threads with the adjacent end portion of the coil spring 47 and into which the adjusting screw 50 is threaded. The threaded stem of the adjusting screw 50 extends through accommodating apertures in the casing 11 and frame 45 and has an enlarged head 50' bearing upon a washer 52 which is held between the adjacent portions of the casing 11 and frame 45. A larger diameter compression coil spring 53 is coaxially disposed in surrounding relation about the tension coil spring 47 and bears against the adjacent portions of the armature 30 and armature arm straps 38 at one end and against flat shoulders formed on interior surfaces of the lower portion of the supporting frame 45.

The forward end of the top 37c of the arm 37 is apertured to receive a rivet 55 for coupling to the arm 37 the connecting rod assembly 56 supporting the saw blade. The connecting rod assembly comprises an elongated connecting rod 58 arranged in a generally vertical position and having an aperture at the upper end thereof through which a bearing sleeve 59 of suitable material, for example neoprene, extends, the bearing sleeve having a bore for accommodating the rivet 55. Suitable fiber washers 60 may be interposed between the ends of the bearing sleeve 59 and the end portions of the strap members 38 forming the armature arm 37. The lower end portion 58' of the connecting rod 58 is inclined slightly in a forward direction or to the right as viewed in FIGURE 2 from a vertical line through the rivet 55 and has a knurled socket 61 into which is driven a knurled formation 62 at the upper end of a blade retainer 63 to securely hold these elements together. The blade retainer 63 has an annular cylindrical groove 64 in the outer surface of an intermediate portion thereof and an externally threaded and convergently tapered lower end 65 having a diametric axially elongated slot to receive the shank of the saw blade 57. Threaded thereon is a tapered, hexagonal blade nut 66 forming with the lower end 65 a blade chuck. The connecting rod assembly 56 is resiliently supported for axial movement near its lower end by a flexible rubber mounting block 67 of a known type having tapped metallic mounting plates embedded therein along the inner and outer faces of the block. The inner end of the mounting block 67 is secured by screws 68 to the frame 45 while a clamping bracket 69 having a convex central portion extending about and fitting into the groove 64 of the connecting rod assembly 56 is secured by screws to the embedded mounting plate of the outer face of mounting block 67.

The connecting rod 58 has an integral angular extension 70 projecting in the direction of the electromagnet 18 from the upper end thereof forming an actuator for an air circulating pump assembly 71 provided to effect adequate ventilation of the electromagnet core and insure such air movement about the coil area as to produce effective dissipation of the generated heat by air convection currents. The air pump assembly 71 is illustrated in exploded section in FIGURE 8 and comprises a dish shaped pump cylinder 72 having a small central aperture 72', a diaphragm 73 of rubber or similar material, and a diaphragm retainer ring 74 which is substantially coextensive with the annular flange of the pump cylinder 72. The cylinder 72, diaphragm 73 and ring 74 are assembled together in sandwich fashion and held at diametrically opposed peripheral regions of the sandwich between jaw formations defined by the upper and lower sides of slots 75 formed in the adjacent surfaces of etxensions 76 of the frame halves 45a, 45b. The diaphragm 73 is flexed out of its normal plane by a dish-shaped pump plate 77 generally conforming to the configuration of the frusto-conical well formed by the pump cylinder 72, the diaphragm 73 being connected to the pump plate by a screw 78 extending through a lock washer 79 and central apertures 73' and 77' of the diaphragm and pump plate, respectively, and threaded into internally threaded pump shaft 80. The pump shaft 80 is coupled to the angular extension 70 of the connecting rod 58 by means of a rubber tube 81 which receives and tightly grips the shaft 80 and extension 70 at the opposite ends of the tube 81.

Immediately below the opening 72' of the pump cylinder 72, the supporting frame 45 is provided with a funnel shaped extension 82 provided with an air inlet opening 82' at the top thereof through which air expelled from the pump passes into the zone of the electromagnet coil 23 encased between the outwardly bulged portions of the frame halves 45a, 45b.

The manual control switch 25 may be supported in any convenient manner, but in the herein illustrated embodiment is securely fixed to the pivot straps 42 by angle brackets 83 having vertical flanges lapping over and riveted to the pivot straps and horizontal flanges projecting inwardly between the straps 42 to which the opposite ends of the switch housing are riveted.

Each of the casing halves 11a, 11b is provided with bosses or like formations 84 on the inner surfaces thereof projecting into accommodating openings or sockets in the supporting frame halves 45a, 45b, some of which have bores to receive bolts for securing the casing halves in assembled relation, and socket bosses 85 are provided in the upper region of the casing halves to receive projecting stubs extending laterally from the pivot straps 42 and underlying parts of the frame arms 43, 44.

In the operation of the saber saw construction described above, actuation of the manual switch 25, which is here illustrated as mounted in the grip member 15 of the handle portion 14, closes the supply circuit to the coil 23 of the electromagnet 18. Variations in the magnetic field produced in response to variations in the 60-cycle A.C. supply current to the electromagnet coil vibrates the armature 30 at twice the applied alternating current frequency toward and away from the stator core legs 20 and 21. The movement of the armature arm 37 and armature 30 occurs about the pivot point 39, producing vertical movement of the free end of top portion 37c of arm 37 along a shallow arc of relatively long radius. The compression spring 53 assists the magnet in attracting the armature 30 and the tension spring 47 has the function of returning the armature to its outermost position during each decay of the flux established by current flow in the electromagnet coil 23 from a maximum to zero. In performing the function of returning the armature 30 to its outermost position, the tension spring 47 additionally imposes a compression on the compression spring 53 whereby the latter may supplement the flux in attracting the armature 30 during the next quarter cycle. The tension spring 47 is coupled to the adjusting screw 50 so that effective adjustment to compensate for production variations in parts, assembly, spring rates, and operating line voltages may be made by slight turning of the screw 50. The springs 47 and 53 are preferably selected to provide a total spring rate which will, in combination with the mass, give the system substantially a natural frequency of from 10 to 20 cycles below the operating frequency of 120 cycles per second, when operated on a 60-cycle power supply. The tension spring 47 is, of course, adjusted so as to cause the armature 30 to reverse its direction of travel toward the core 19 just before the armature 30 actually contacts the ends of the stator core legs 20 and 21 so as to eliminate chatter.

In practice, the springs are selected to hold the natural resonant frequency of the system of between 104 and 107 cycles per second. If the natural resonant frequency is much higher than this, the stroke becomes longer, the current higher, and the tool stalls very easily. If the natural resonant frequency is much below 104 cycles per second, the stroke shortens, the current drops, and it becomes difficult to stall. As the force is great enough at 104 cycles for all practical purposes, the further shortening of the stroke is undesirable.

It will be appreciated that, during operation of the saber saw, the vibration of the armature and components connected therewith produces reactive forces of the masses within the casing which would cause the movement of the casing and blade in space to depart from the true path determined by the blade mounting system.

The point of attachment of the rubber mount 67 to the frame 45 is preferably located to correct for the movement of the casing caused by these reactive forces and cause the blade 57 to move along a slightly orbital or elliptical path, such that the teeth of the blade are slightly withdrawn from the surface of the wood cut on the down stroke of the blade and advance into cutting contact with the wood during the up or return stroke. When the blade is driven along such a path, the blade is relatively free of frictional contact with the wood on the down stroke, so that the wood resistance on the blade is considerably below the resistance values which would occur if the blade followed a true rectilinear or arcuate path. This facilitates removal of chips and saw dust from the kerf and reduces the net vibration coupled to the hand of the user. This action is increased by positioning the blade in a downwardly and slightly forwardly inclined direction, which is here accomplished with a straight or conventional saw shank by so inclining the lower portion 58' of the connecting rod, as the blade teeth due to this inclination tend to withdraw (toward the left as viewed in FIG. 2) from the surface of the cut as the blade progresses downwardly from its uppermost position, and the teeth tend to advance toward the surface of the cut as the blade progresses upwardly during the return stroke.

The inner end of the mounting block 67 adjacent the frame 45 will normally be located at such a position vertically of the frame that it is unstressed or substantially unstressed when the connecting rod 58 is at the upper limit of its stroke, with the stressing of the block progressively increasing as the connecting rod moves downwardly from its upper limit position.

The reciprocation of the connecting rod 58 by the armature arm 37 also effects actuation of the air circulating pump 71 to ventilate and cool the electromagnet coil through corresponding reciprocative movement of the angular extension 70 integral with the connecting rod 58 without requiring a separate fan and fan motor unit. During the downward stroke of the connecting rod 58 and extension 70, the pump plate 77 is forced downwardly beyond the plane of the periphery of diaphragm 73, deforming the diaphragm into the dish-shaped well formed by the stationary pump cylinder 72 and expelling the air in the pump cylinder 72 downwardly in a high pressure stream through the central aperture 72' and funnel-shaped extension 82 of the frame 45. The air stream propelled through the funnel-shaped extension 82 circulates about the coil 23 and exits from this zone alongside the armature 30 and into the region of the springs 47, 53 where the frame halves 45a, 45b laterally flank the springs but do not extend across the space between the frame halves above and below the springs. The air escapes from the casing through air outlet openings 88 in the casing. During the upward or return stroke of connecting rod 58 and extension 70, the pump plate 77 is drawn upwardly to a position where the lowermost surface portion thereof is located substantially at the plane of the periphery of the diaphragm 73. The diaphragm 73 is thus returned to its normal undeformed state increasing the volume of the chamber defined by the pump cylinder 72 and diaphragm 73 and drawing air into this chamber through the aperture 72' from the zones radially surrounding the cylinder 72 which communicate with air inlet openings 87 in the casing. The high speed reciprocation of the pump plate 77 thus produces convection currents of ambient air through the chamber defined by the forward portion of the frame 45 and about the electromagnetic coil 23 which effectively cools the coil to maintain temperatures significantly below the levels which would obtain without this air cooling system.

While but one preferred example of the present invention has been particularly shown and described, it is apparent that various modifications may be made therein within the spirit and scope of the invention, and it is desired, therefore that only such limitations be placed on the invention as are imposed by the prior art and set forth in the appended claims.

What is claimed is:

1. A portable electromagnetic power saw of the reciprocative blade type comprising a casing, an alternating current electromagnet in said casing including a core extending along a selected axis having a pair of pole faces adjacent one end of the electromagnet and an electromagnet coil adapted to be energized by alternating current electrical energy, a moveable armature adjacent said one end for movement toward and away from said pole faces upon operation of the electromagnet, a reciprocative rod member for removably holding a saw blade extending generally perpendicularly to said axis and located beyond the opposite end of said electromagnet relative to said armature, lever means pivotally supported at a fixed location in said casing at a point spaced above said core having a first lever arm extending below said point supporting said armature for swinging movement toward and away from said pole faces and a second lever arm extending from said point above said core and terminating in a pivotal connection with said rod member for reciprocating said rod member responsive to variations in the magnetic flux in said core, and spring means for resiliently urging said armature away from said pole faces.

2. A portable electromagnetic power saw of the reciprocative blade type comprising a casing, a reciprocative rod member adjacent one end of said casing extending generally vertically of the casing for removably holding a saw blade, an alternating current electromagnet at an intermediate location in said casing including a U-shaped core having a pair of vertically spaced core legs extending along substantially horizontal axes and terminating in vertically spaced pole faces at an end of the electromagnet remote from said rod member and lying in planes inclined to the axes of the core legs, an armature coacting with said core including a pair of inclined faces disposed to lie in substantial parallelism with said pole faces when said armature is at a proximal limit position relative to said core, lever means pivotally supported at a fixed location in said casing at a point spaced above said core having a first lever arm extending below said point rigidly connected to said armature for supporting the latter for swinging movement toward and away from said pole faces and a second lever arm extending from said point above the electromagnet to said rod member terminating in a pivotal connection with the rod member adjacent the upper end of the latter for reciprocating said rod member responsive to variations in the magnetic flux in said core, and spring means for resiliently urging said armature away from said pole faces.

3. A portable electromagnetic power saw of the reciprocative blade type comprising a casing having a lower housing portion and a handle of generally inverted U-shaped configuration spaced above said lower portion and connected thereto by vertical posts, a reciprocative rod member adjacent one end of said casing extending generally vertically of the casing for removably holding a saw blade, an alternating current electromagnet at an intermediate location in the lower housing portion of said casing including a U-shaped core having a pair of vertically spaced core legs extending along substantially horizontal axes and terminating in vertically spaced pole faces at an end of the electromagnet remote from said rod member and lying in planes inclined to the axes of the core legs, an armature coacting with said core including a pair of inclined faces disposed to lie in substantial parallelism with said pole faces when said armature is at a proximal limit position relative to said core, lever means pivotally supported at a fixed location in said handle at a point spaced above said core having a first lever arm extending below said point through one of said posts rigidly connected to said armature for supporting the latter for swinging movement toward and away from said pole faces and a second lever arm extending from said point internally through said handle above the electromagnet to said rod member terminating in a pivotal connection with the rod member adjacent the upper end of the latter for reciprocating said rod member responsive to variations in the magnetic flux in said core, and spring means for resiliently urging said armature away from said pole faces.

4. A portable electromagnetic power saw of the reciprocative blade type comprising a casing having a lower housing portion and a handle of generally inverted U-shaped configuration spaced above said lower portion and connected thereto by vertical posts, a reciprocative rod member adjacent one end of said casing extending generally vertically of the casing for removably holding a saw blade, an alternating current electromagnet at an intermediate location in the lower housing portion of said casing including a U-shaped core having a pair of vertically spaced core legs extending along substantially horizontal axes and terminating in vertically spaced pole faces at an end of the electromagnet remote from said rod member and lying in planes inclined to the axes of the core legs, an armature coacting with said core including a pair of inclined faces disposed to lie in substantial parallelism with said pole faces when said armature is at a proximal limit position relative to said core, lever means pivotally supported at a fixed location in said handle at a point spaced above said core having a first lever arm extending below said point through one of said posts rigidly connected to said armature for supporting the latter for swinging movement toward and away from said pole faces and a second lever arm extending from said point internally through said handle above the electromagnet to said rod member terminating in a pivotal connection with the rod member adjacent the upper end of the latter for reciprocating said rod member responsive to variations in the magnetic flux in said core, a rigid frame within said casing having portions extending outwardly about the electromagnet and upwardly projecting arms extending through said posts and rigid bridge means connected to said frame arms and extending within said handle, and pivot pin means extending through said lever means and said bridge means forming the pivotal support for said lever means, and spring means for resiliently urging said armature away from said pole faces.

5. A portable electromagnetic power saw of the reciprocative blade type comprising a casing having a lower housing portion and a handle of generally inverted U-shaped configuration spaced above said lower portion and connected thereto by vertical posts, a reciprocative rod member adjacent one end of said casing extending generally vertically of the casing for removably holding a saw blade, an alternating current electromagnet at an intermediate location in the lower housing portion of said casing including a U-shaped core having a pair of vertically spaced core legs extending along substantially horizontal axes and terminating in vertically spaced pole faces at an end of the electromagnet remote from said rod member and lying in planes inclined to the axes of the core legs, an armature coacting with said core including a pair of inclined faces disposed to lie in substantial parallelism with said pole faces when said armature is at a proximal limit position relative to said core, lever means pivotally supported at a fixed location in said handle at a point spaced above said core having a first lever arm extending below said point through one of said posts rigidly connected to said armature for supporting the latter for swinging movement toward and away from said pole faces and a second lever arm extending from said point internally through said handle above the electromagnet to said rod member terminating in a pivotal connection with the rod member adjacent the upper end of the latter for reciprocating said rod member responsive to variations in the magnetic flux in said core, a rigid frame within said casing having portions extending outwardly about the electromagnet and upwardly projecting arms extending through said posts, rigid bridge means connected to said frame arms and extending within said handle, pivot pin means extending through said lever means and bridge means forming the pivotal support for said lever means and a flexible deformable rubber block member fixed at one face to said frame and secured at an opposite face to a lower part of said rod member to resiliently accommodate reciprocative movement of the rod member responsive to movement of said lever means, and spring means for resiliently urging said armature away from said pole faces.

6. A portable electromagnetic power saw of the reciprocative blade type comprising a casing, a reciprocative rod member adjacent one end of said casing extending generally vertically of the casing for removably holding a saw blade, an alternating current electromagnet at an intermediate location in said casing including a U-shaped core having a pair of vertically spaced core legs extending along substantially horizontal axes and terminating in vertically spaced pole faces at an end of the electromagnet remote from said rod member and lying in planes inclined to the axes of the core legs, an armature coacting with said core including a pair of inclined faces disposed to lie in substantial parallelism with said pole faces when said armature is at a proximal limit position relative to said core lever means pivotally supported at a fixed location in said casing at a point spaced above said core having a first lever arm extending below said point rigidly connected to said armature for supporting the latter for swinging movement toward and away from said pole faces and a second lever arm extending from said point above the electromagnet to said rod member terminating in a pivotal connection with the rod member adjacent the upper end of the latter for reciprocating said rod member responsive to variations in the magnetic flux in said core, and resilient spring means extending between said armature and said casing for storing up energy during retraction and attraction strokes of said armature relative to said core to assist return of said armature toward said core from the remote limit position of said armature and for retracting said armature from said pole faces upon decay of magnetic flux.

7. In a portable electric saw, the combination recited in claim 1 comprising an air pump for producing forced air currents about said electromagnet to cool the same including cylinder means having an air passage therein directed toward said electromagnet and a moveable member for altering the volume of said cylinder means to draw air into the latter and expel air therefrom, and extension means moveable with said rod member and coupled to said moveable member to activate the latter during reciprocation of said rod member, and said casing having air inlet openings adjacent said air pump for intake of ambient air and air outlet openings spaced beyond the electromagnet from said air pump.

8. In a portable electric saw, the combination recited in claim 2 comprising an air pump for producing forced air currents about said electromagnet to cool the same including cylinder means having an air passage therein directed toward said electromagnet and a resiliently deformable diaphragm member for altering the volume of said cylinder means to draw air into the latter and expel air therefrom, and extension means moveable with said rod member and coupled to said diaphragm member to activate the latter during reciprocation of said rod member, and said casing having air inlet openings adjacent said air pump for intake of ambient air and air outlet openings spaced beyond the electromagnet from said air pump.

9. In a portable electric saw, the combination recited in claim 4 comprising an air pump for producing forced air currents about said electromagnet to cool the same including cylinder means having an air passage therein directed toward said electromagnet and a resiliently deformable diaphragm member for altering the volume of said cylinder means to draw air into the latter and expel air therefrom, and extension means moveable with said rod member and coupled to said diaphragm member to activate the latter during reciprocation of said rod member, said casing having air inlet openings adjacent said air pump for intake of ambient air and air outlet openings spaced beyond the electromagnet from said air pump and said frame having portions forming an elongated tubular enclosure extending radially along said electromagnet for directing cooling air axially along the electromagnet and having an air inlet opening adjacent said air passage of said cylinder means for directing expelled air into said tubular enclosure portion at one end thereof.

References Cited by the Examiner
UNITED STATES PATENTS 2,790,276   4/57   Acopian   51—170.3
2,946,358   7/60   Bruck   143—68.5

BROUGHTON G. DURHAM, *Primary Examiner.*

MILTON KAUFMAN, *Examiner.*